Oct. 9, 1956  H. G. SHIMP  2,766,188
HYDROCARBON CONVERSION
Filed Dec. 1, 1950
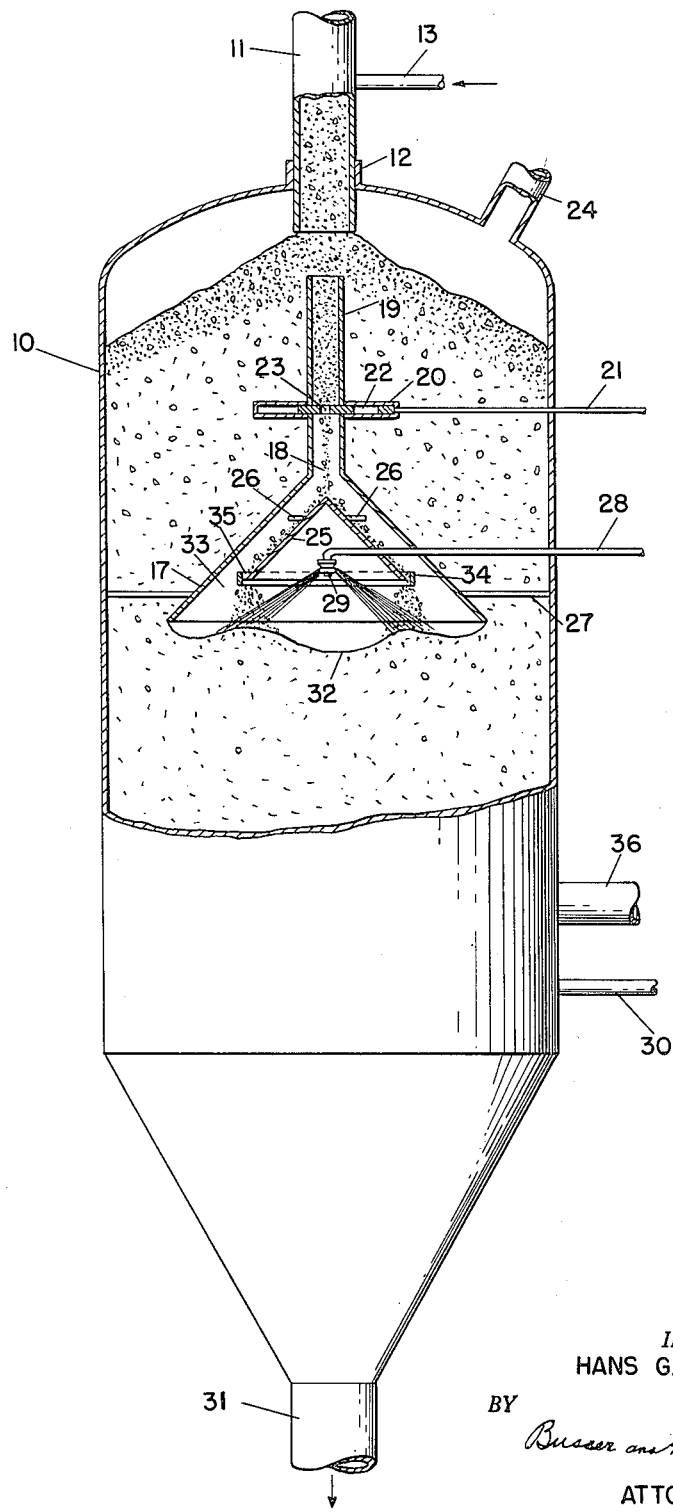
INVENTOR.
HANS G. SHIMP
BY *Busser and Harding*
ATTORNEYS

United States Patent Office 2,766,188
Patented Oct. 9, 1956

2,766,188

HYDROCARBON CONVERSION

Hans G. Shimp, Springfield, Pa., assignor to Sun Oil Company, Philadelphia, Pa., a corporation of New Jersey Application December 1, 1950, Serial No. 198,526

3 Claims. (Cl. 196—52)

This invention relates to hydrocarbon conversion, and more particularly to method for separately introducing two streams of heated hydrocarbon material into contact with a compact bed of particle form solid contact material gravitating through conversion zones.

According to the present invention, a combined conversion zone is provided comprising an upper conversion zone through which particle form solid contact material gravitates and from which the contact material gravitates directly into a lower conversion zone adjacent the upper conversion zone. Heated hydrocarbon vapors are introduced into the combined conversion zone at one extremity thereof and flow therethrough to the other extremity. Heated hydrocarbon in liquid phase is introduced into an engaging zone situated adjacent both the upper and lower conversion zones. Vapors are evolved from the liquid hydrocarbon upon contact with contact material, and these vapors flow together with the first-named vapors from a place adjacent both the upper and lower conversion zone to the above-mentioned other extremity of the combined conversion zone.

Freshly made or regenerated or reheated particle form contact material is introduced at a conversion-supporting temperature into the top of the combined conversion zone. One portion of contact material thus introduced is caused to fall freely through the engaging zone, wherein it engages atomized liquid hydrocarbon material. A second portion of contact material thus introduced gravitates downwardly around the engaging zone and through the upper conversion zone. Contact material having gravitated through the upper conversion zone gravitates directly into the lower conversion zone and therethrough as a compact bed. Contact material having fallen freely through the engaging zone falls onto the surface of the latter compact bed.

According to the invention, hydrocarbon vapors can be introduced either into the upper extremity of the combined conversion zone, i. e. into the top of the upper conversion zone or into the lower extremity of the combined conversion zone, i. e. into the bottom of the lower conversion zone. In the former case, concurrent flow of vapors and contact material occurs, and vapors evolved from the liquid hydrocarbon flow through the lower conversion zone. In the latter case, countercurrent flow of vapors and contact material occurs, and vapors evolved from the liquid hydrocarbon flow through the upper conversion zone. In either case, the vapors separately introduced at an extremity of the combined conversion zone pass through both the upper and lower conversion zones to the other extremity of the combined conversion zone.

The method according to the invention has advantages as subsequently described, particularly in hydrocarbon conversion processes, such as cracking, where it is desired to contact, in a single operation in a single unit of apparatus, two different hydrocarbon charge stocks having different properties. By separately introducing the two different charge stocks, particularly beneficial results as subsequently described are obtained.

According to the present invention, the vapors which are introduced into contact with the solids bed at an extremity of the combined conversion zone are preferably more refractory to cracking than the hydrocarbon material which is introduced in liquid phase into the engaging zone. That is, it is preferred that those vapors have such composition that they require longer time in contact with particle form solid contact material in order to give a desired yield of certain cracked products, e. g. gasoline, than is required to give the same yield from the liquid hydrocarbon material. Operation according to the invention is advantageous in that the relatively more refractory vapors have longer residence time in contact with particle form contact material than do the vapors evolved from the relatively less refractory liquid hydrocarbon material, since the latter vapors flow through only one of the conversion zones, whereas the relatively more refractory vapors flow through both the upper and lower conversion zones. In this manner, cracked products are obtained containing a larger proportion of gasoline than products obtained by cracking, as in prior art processes, relatively more refractory vapors and vapors evolved from relatively less refractory liquid hydrocarbon material with residence time substantially the same for both types of vapors.

The relatively more refractory hydrocarbon vapors introduced according to the invention at an extremity of the combined conversion zone can be any charge stock suitable for introduction as vapor, e. g. recycle light gas oil from a previous cracking operation, or straight run light gas oil. This vapor-phase charge has such boiling range that it can be readily vaporized in conventional oil-heating apparatus. The relatively less refractory hydrocarbon material introduced in liquid phase can be any charge stock suitable for such introduction, e. g. heavy gas oil. This hydrocarbon material generally is less volatile than the above relatively more refractory hydrocarbon, and is introduced in liquid phase because it is not readily vaporized in conventional oil-heating apparatus.

The invention will now be described with reference to the attached drawing which is a view partly in elevation and partly in vertical section of apparatus representing one embodiment of the invention.

In the drawing there is represented an apparatus for hydrocarbon conversion comprising a vertical conversion housing 10, having circular or other suitable horizontal cross-section, and having at the top thereof an inlet 11 for particle form solid contact material. The inlet pipe 11 passes through stuffing box 12 and is slidably associated with the top of conversion housing 10. An inlet pipe 13 for gasiform inert sealing medium communicates with inlet pipe 11.

Within housing 10, there is situated an upright frusto-conical member 17 constituting a partition positioned transversely of housing 10 and spaced apart from housing 10. Any other suitable such partition can be employed, for example, any other symmetrical upwardly tapered truncated baffle, such as a truncated square, hexagonal, or other pyramid. At the top of member 17 is an aperture 18 constituting a central passage through the partition defined by member 17. Above member 17 and communicating with aperture 18 thereof is a central vertical conduit 19, adapted to receive a portion of the contact material introduced into housing 10 through inlet 11. Horizontal valve member 20 is slidably associated with conduit 19 to restrict the flow of contact material therethrough, and has an operating handle 21 extending through and terminating exteriorly of housing 10. As shown, valve member 20 has two spaced passages 22 and 23. Passage 22 has horizontal cross-section substantially equal to the horizontal cross-section of conduit 19, and passage 23 has horizontal cross-section substantially less than that of conduit 19. Any other suitable type of valve member can be used to provide free fall of contact material below the valve, e. g. an iris diaphragm as shown in Figure 2 of U. S. Patent 2,458,162 to William A. Hagerbaumer, dated January 4, 1949.

Upright conical member 25 terminates in an apex and is situated substantially directly beneath aperture 18 of member 17. The base plane of member 25 has about half as great diameter as that of member 17 and is on a higher horizontal level than the base plane of member 17. Member 25 is supported by supports 26 in spaced relation to member 17 to provide a passage for contact material therebetween. Member 17 is supported by supports 27 in spaced relation to housing 10.

Pipe 28 is adapted to be traversed by liquid hydrocarbon material, and extends from the exterior of housing 10 to the interior thereof. Pipe 28 communicates with and supports an atomizer 29 of any suitable type, for example as disclosed in an application of James E. Evans, Serial No. 756,031, filed June 20, 1947, now United States Patent No. 2,553,561 issued May 22, 1951. Ring 34 is supported by supports 35 in spaced relation to the bottom of conical member 25. Ring 34 provides an annular passage to control dispersion of solid particles as they pass the bottom of conical member 25.

Conduit 36 for hydrocarbon vapors is situated near the bottom of housing 10. Conduit 36 communicates with means not shown for either disengaging vapors from or for distributing vapors to the catalyst bed.

Inlet 30 for gasiform stripping medium is situated beneath conduit 36. At the bottom of housing 10 is an outlet 31 for contact material.

Although member 25 is described above as being conical in shape, it is to be understood that it can be any other suitable shape; for example, it can be any other upright symmetrical upwardly tapered baffle, such as a square, hexagonal, or other pyramid, terminating in an apex.

Operation according to the invention will be described with reference to a process wherein hydrocarbon vapors flow countercurrent to the moving solids bed. Concurrent flow of vapors and solids is, however, within the scope of the invention. Particle form contact material, e. g. cracking catalyst, is introduced through inlet 11 into the upper portion of housing 10. One portion of the contact material enters conduit 19 and gravitates therethrough as a compact mass in the portion of conduit 19 above valve member 20, and as a freely falling stream below valve member 20. Valve member 20 restricts or controls downward flow of contact material through the portion of conduit 19 above valve member 20. Contact material falls freely beneath valve member 20 onto the upper surface 32 of the compact bed of contact material gravitating through the lower conversion zone. Contact material falling freely beneath valve member 20 is deflected in its path by conical member 25 and passes through the annulus provided by ring 34 and falls therebeneath as a shower of particles. Atomizer 29 ejects atomized liquid hydrocarbon oil into engagement with contact material, either while falling as a shower of particles or after having fallen upon upper bed surface 32.

Another portion of contact material introduced through inlet 11 gravitates around conduit 19 and around truncated conical member 17 as a compact mass comprising a moving bed of contact material extending from member 17 to the wall of housing 10. Vapors evolved upon engagement of liquid hydrocarbon with contact material pass around the lower edge of partition 17 and upwardly through the bed moving through the upper conversion zone.

Relatively refractory hydrocarbon vapors are introduced through conduit 36 into the catalyst bed gravitating through the lower conversion zone. The vapors thus introduced flow upwardly through the bed and around partition 17 into the compact bed gravitating through the upper conversion zone. After passing upwardly through the upper conversion zone, all vapors are removed from housing 10 through conduit 24.

It will be noted from the drawing and the above description that atomizer 29 is disposed in a chamber or engaging zone 33 bounded below by bed upper surface 32 and bounded above by truncated conical member 17.

An inert stripping medium is introduced through inlet 30 and suitable distributing means not shown into the compact bed gravitating through the lower conversion zone. Contact material is withdrawn from the bottom of the conversion zone bed through outlet 31 for conveyance to suitable regeneration or reheating apparatus not shown. The rate of withdrawal through outlet 31 is substantially equal to the rate of supply through inlet 11.

Inert sealing medium, e. g. steam, is introduced through sealing medium inlet 13 into contact material inlet 11. The pressure differential between inlet 13 and vapor space above the compact bed in the upper conversion zone is maintained sufficiently great that the vapors in chamber 33 are forced through that compact bed and do not cut off the flow of contact material through valve member 20.

The relative rates of contact material flowing through the engaging zone in chamber 33 and through the upper conversion zone around frustoconical member 17 are subject to variation within the scope of the invention. Generally speaking, the effect of increasing the relative rate of flow through the upper conversion zone is to increase the flow rate ratio of contact material to vapors in the upper conversion zone and thereby to increase the temperature of the vapors leaving the apparatus through outlet 24.

Variation in the relative rates of flow above can be effected by changing the size of the orifice restricting contact material flow through the engaging zone, or with an orifice of given size, changing the rates of introduction of contact material through inlet 11 and of withdrawal of contact material through outlet 31.

It is to be understood that, instead of the conduit 19, valve member 20, and conical member 25 shown in the drawing, any other suitable means can be employed for providing free fall through chamber 33 of a portion of the contact material introduced into housing 10 through inlet 11. For example, there can be provided a vertical conduit with an annular metering passage at the bottom thereof as shown in U. S. Patent 2,493,036 to Reuben T. Savage et al., dated January 3, 1950. Or, alternatively, in the absence of vertical conduit 19 and valve member 20, an aperture 18 in truncated conical member 17 can be provided having such size that it restricts contact material flow sufficiently that a portion of the contact material introduced into housing 10 through inlet 11 falls freely through chamber 33. Vertical conduit 19 is generally advantageous in that it facilitates obtaining uniformity in the distribution of the contact material falling freely through chamber 33. Nevertheless, it can if desired be omitted, as described above.

The conical member 25 has as primary function the dispersing of freely falling contact material into a curtain or shower of particles. Although such dispersing is not essential to the invention and conical member 25 can accordingly be absent, provided means are present for causing free fall of contact material through chamber 33, nevertheless, such dispersing is advantageous in that it permits the bed surface 32 to be maintained more nearly level than when such dispersing is not effected, and thus reduces the tendency of liquid hydrocarbon to become disadvantageously concentrated at low points in the surface 32.

The partition 17 which bounds the engaging zone is preferably, as shown in the drawing, frustoconical in shape with an aperture at the apex and with sidewalls inclined at an angle with the horizontal within the approximate range 45–65°. Angles less than 45° tend to cause stagnation in the solids bed above the partition, and angles greater than 65° result in partitions having inconveniently great vertical height. The deflecting member within the engaging zone is, when present, preferably conical in shape with side walls inclined at the same angle as those of the partition.

When a conical member as represented by numeral 25 in the drawing is employed in conjunction with a frusto-conical member, as indicated by numeral 17, the diameter of the base plane of the member 25 is preferably about half, say within the range one-third to two-thirds, of the diameter of the base plane of the member 17, because such dimensions generally provide an advantageous degree of dispersion of freely falling particles over the bed surface 32. Also the vertical distance between the inclined surfaces of members 17 and 25 has magnitude such that sufficient space for unrestricted travel of solids between those surfaces is provided, yet such that the base plane of member 25 is higher to an advantageous degree than the base plane of member 17. For most sizes of apparatus that will commonly be employed, e. g. apparatus where the base plane of member 17 has about ten-foot diameter, a vertical distance of 4 inches or greater is sufficient, though larger distances can be used; in apparatus which is substantially larger, the distance between the inclined surfaces will be greater. A ring 35, as shown in the drawing, does not have to be employed. However, where such ring is employed, it is preferably spaced about two inches outwardly from the bottom edge of member 25.

In the preceding description of the drawing conduit 36 is disclosed as functioning as an inlet for hydrocarbon vapors, and conduit 24 as an outlet for hydrocarbon vapors. It is to be understood that when concurrent, rather than countercurrent flow of vapor and catalyst is used, conduit 36 functions as an outlet, and conduit 24 as an inlet for hydrocarbon vapors. It is preferred that the upper hydrocarbon vapor conduit communicate, as conduit 24 is represented in the drawing, directly with the vapor space above the surface of the contact material bed gravitating through the upper conversion zone. It is within the scope of the invention, however, for the upper conduit to communicate with suitable vapor-disengaging or vapor-introducing means situated within the contact material bed gravitating through the upper conversion zone.

The method according to the invention is particularly advantageously used in catalytic hydrocarbon conversions. When apparatus as pictured in the drawing is used in catalytic cracking, the contact material introduced into housing 10 through inlet 11 is at a suitable conversion-supporting temperature, e. g. 800–1200° F., and comprises suitable cracking catalyst, e. g. natural or activated clay, silica, alumina, synthetic silica-alumina catalyst, alone or with certain metallic oxides added, the catalyst being in suitable form, e. g. lump, pelleted, or extruded. Suitable catalyst particle sizes include major dimensions of $\frac{1}{16}''$ to $\frac{3}{4}''$. The hydrocarbon material introduced into atomizer 29 through pipe 28 is at a suitable elevated temperature, e. g. 400–800° F., is substantially free from catalyst poisons, and comprises suitable charge stock for liquid-feed catalytic cracking, e. g. heavy gas oil or deasphalted reduced crude petroleum or other petroleum residue; the hydrocarbon material is generally introduced at elevated pressure, e. g. 10–200 pounds per square inch gauge. The hydrocarbon vapors introduced at an extremity of the combined conversion zone are at suitable elevated temperature, e. g. 850–950° F., are substantially free from catalyst poisons, and comprise suitable charge stock, e. g. light gas oil, naphtha, recycle stock, etc. Other types of catalytic hydrocarbon conversion than cracking can be effected, e. g. desulfurization, reforming or dehydrogenation of naphtha, etc., in the presence of suitable catalyst, such as the above or other known catalyst.

The method according to the invention is advantageous in that it makes it possible to obtain, from simultaneous cracking of two hydrocarbon charge stocks having different properties, cracked products having a high degree of uniformity of composition and a high content of desired products, e. g. gasoline, unobtainable with prior art methods. These advantageous effects are obtained by virtue of the fact that in the lower conversion zone hydrocarbon vapors are contacted with solids on which liquid hydrocarbon material has been spread with a high degree of uniformity, the latter provided by the manner in which atomized liquid engages freely falling solids in the engaging zone; and in the upper conversion zone hydrocarbon vapors are contacted with solids which are free from deposits from liquid hydrocarbon material. This combination of features results in the advantages mentioned above.

The present invention provides method for accomplishing a type of operation, hitherto impractical, whereby a liquid charge stock is engaged with contact material and the evolved vapors passed countercurrent to a moving bed of contact material. The present invention contemplates such operation as well as concurrent flow of evolved vapors and contact material.

When, according to the invention, hydrocarbon vapors flow concurrently with contact material, the vapors first pass through an upper conversion zone wherein the contact material has not, since being made up, reheated, or regenerated, contacted liquid hydrocarbon; then the vapors pass through a lower conversion zone wherein the contact material has had liquid hydrocarbon material spread thereon. In countercurrent flow processes, on the other hand, the vapors first pass through the lower conversion zone containing liquid-contacted solids, then through the upper conversion zone containing solids free from deposits from liquid hydrocarbon.

Aside from the above-noted differences between concurrent and countercurrent flow, it is to be noted that countercurrent flow of vapor and solids results in less attrition of the solid particles than occurs when vapor and solids move concurrently downward.

The method according to the invention is further advantageous in that a compact mass of contact material is provided between the wall of vertical housing 10 and the spray of atomized hydrocarbon material ejected from atomizer 29, thus preventing the liquid from being sprayed directly on the wall and forming carbonaceous deposits thereon.

In my copending application, Serial No. 198,525 filed December 1, 1950, there is disclosed and claimed a method of converting hydrocarbon, similar in some respects to that claimed herein, but lacking the feature of passing separately introduced hydrocarbon vapors throughout the vertical length of a combined conversion zone comprising upper and lower conversion zones. The apparatus disclosed in the present application is not claimed herein, since it forms the subject matter of claims of the above-identified copending application.

I claim:

1. Method for converting hydrocarbon oil which comprises: dividing particle form solid contact material into a first portion and a second portion; passing said first portion of particle form solid contact material downwardly by gravity at conversion temperature as a compact mass through an upper conversion zone; passing said second portion of particle-form solid contact material at conversion temperature through an engaging zone; introducing atomized liquid hydrocarbon oil containing hydrocarbons relatively less refractory to conversion into said engaging zone and into engagement with at least part of said second portion of said contact material; removing contact material downwardly by gravity from said upper conversion zone and from said engaging zone; passing contact material thus removed from said upper conversion zone and from said engaging zone downwardly together by gravity as a second compact mass through a lower conversion zone; said upper conversion zone and said lower conversion zone comprising together a combined conversion zone; introducing hydrocarbon vapors containing hydrocarbons relatively more refractory to conversion into said combined conversion zone at an extremity thereof; passing said vapors through said combined conversion zone to the other extremity thereof; passing vapors evolved from said liquid hydrocarbon oil into the solids bed in said combined conversion zone at a level between said upper conversion zone and said lower conversion zone; passing the last-named vapors from said level together with said hydrocarbon vapors to said other extremity of said combined conversion zone, whereby the first-named vapors are contacted with more contact material in passing through said combined conversion zone than the vapors evolved from said liquid hydrocarbon oil upon said engagement, whereby the more refractory hydrocarbons are subjected to more severe conversion conditions than the less refractory hydrocarbons; and removing vapors from said other extremity of said combined conversion zone.

2. Method according to claim 1 wherein said hydrocarbon vapors are introduced into said combined conversion zone at the lower extremity thereof.

3. Method according to claim 1 wherein said hydrocarbon vapors are introduced into said combined conversion zone at the upper extremity thereof.

References Cited in the file of this patent

UNITED STATES PATENTS

| | | |
|---|---|---|
| 2,492,998 | Lassiat | Jan. 3, 1950 |
| 2,558,769 | McKinney | July 3, 1951 |
| 2,565,811 | Hall | Aug. 28, 1951 |
| 2,636,805 | Lassiat et al. | Apr. 28, 1953 |